(12) United States Patent
Sekiba et al.

(10) Patent No.: US 9,592,946 B2
(45) Date of Patent: Mar. 14, 2017

(54) PACKAGED SOLID OBJECT AND METHOD FOR MANUFACTURING THEREOF

(75) Inventors: Yutaka Sekiba, Odawara (JP); Yasuhiro Hayashi, Odawara (JP)

(73) Assignee: MEIJI CO., LTD., Tokyo (JP)

( * ) Notice: Subject to any disclaimer, the term of this patent is extended or adjusted under 35 U.S.C. 154(b) by 0 days.

(21) Appl. No.: 13/991,904

(22) PCT Filed: Nov. 30, 2011

(86) PCT No.: PCT/JP2011/077723
§ 371 (c)(1),
(2), (4) Date: Jul. 5, 2013

(87) PCT Pub. No.: WO2012/077560
PCT Pub. Date: Jun. 14, 2012

(65) Prior Publication Data
US 2013/0292273 A1 Nov. 7, 2013

(30) Foreign Application Priority Data
Dec. 6, 2010 (JP) ................................. 2010-272032

(51) Int. Cl.
  *B65D 81/28* (2006.01)
  *B65D 81/20* (2006.01)
  *A23L 3/3409* (2006.01)
  *B65B 31/04* (2006.01)

(52) U.S. Cl.
  CPC ........ *B65D 81/2069* (2013.01); *A23L 3/3409* (2013.01); *B65D 81/2023* (2013.01); *B65D 81/2084* (2013.01); *B65B 31/04* (2013.01)

(58) Field of Classification Search
  CPC ............ B65D 81/2069; B65D 81/2084; B65D 81/2023; A23L 3/3409
  USPC ....... 206/213.1; 426/87, 129, 127, 118, 316, 426/130, 133, 317
  See application file for complete search history.

(56) References Cited

U.S. PATENT DOCUMENTS

| | | | |
|---|---|---|---|
| 1,374,555 A * | 4/1921 | Dick | 426/98 |
| 3,615,718 A * | 10/1971 | Weinstein | 426/116 |
| 4,981,007 A * | 1/1991 | Shima et al. | 53/432 |
| 5,116,660 A * | 5/1992 | Komatsu et al. | 428/192 |
| 6,117,538 A * | 9/2000 | Hirata et al. | 428/315.9 |
| 2008/0081091 A1* | 4/2008 | Reda | 426/87 |
| 2009/0035424 A1* | 2/2009 | Mita et al. | 426/113 |
| 2009/0297667 A1* | 12/2009 | Ruzek et al. | 426/87 |

FOREIGN PATENT DOCUMENTS

| | | |
|---|---|---|
| JP | 2004-203424 A | 7/2004 |
| JP | WO2008117594 A1 | 10/2008 |

OTHER PUBLICATIONS

English translation of JP2004203424A by Naoto Ikuta using ESpacenet.*
International Search Report of international patent application No. PCT/JP2011/077723 completed on Dec. 21, 2011 and mailed Jan. 24, 2012 (2 pages).

* cited by examiner

*Primary Examiner* — Anthony Stashick
*Assistant Examiner* — James M Van Buskirk
(74) *Attorney, Agent, or Firm* — Pyprus Pte Ltd

(57) ABSTRACT

A packaged product which comprises a solid object and a packaging that seals and holds the solid object, wherein a replacement gas is contained in a space sealed by the packaging when the packaging is sealed and wherein the solid object has absorbed a part of or all of the replacement gas.

8 Claims, 11 Drawing Sheets

(a)                              (b)

PACKAGED SOLID OBJECT AND METHOD FOR MANUFACTURING THEREOF

TECHNICAL FIELD

The present invention relates to a packaged solid object and a method for manufacturing thereof, and more particularly to one or more solid objects which are filled with a replacement gas and then sealed, and to a method for manufacturing thereof. In doing this way, the replacement gas are absorbed by the solid objects, and so, a gap between the solid objects and the packaging can be reduced, and moreover, when the packaging is opened, the solid objects become ease to be taken out of the packaging by air getting into the gap between the solid objects and the packaging.

BACKGROUND ART

Solid milk is disclosed in Japanese patent No 4062357 (following patent reference 1).

This solid milk is a milk solid object compressed formation. For example, the solid milk has high porosity and thus there is a problem that it is fragile at the time of transportation.

The technology of pillow packaging for pharmaceutical preparation is disclosed in Japanese patent publication No 2010-235599 (following patent reference 2). The pillow packaging is the technology for sealing and holding a solid object, which is content, with a packaging.

When one or more solid objects of tablet shape (for example the above mentioned solid milk) is held, it is thought that the solid object is held by the above pillow packaging. If a gap is provided so that the solid object can be taken in and out of a packaging, the solid objects will be easily broken because some solid objects collide with each other during transportation of the solid object. On the other hand, if the packaging holding the solid objects is widened to degree of the solid object size, it will be difficult to package the solid objects in the packaging and to take the solid objects out of the packaging.

In such case, it is thought that the solid object is held with deaerating the packaging and then the packaging is sealed in vacuum void. However, in the case of holding solid milk in vacuum chamber, there is a problem that milk powder is separated from the surface of solid milk.

CITATION LIST

Patent Literature

Patent Literature 1: Japanese Patent No 4062357
Patent Literature 2: Japanese Patent Publication No 2010-235599

DISCLOSURE OF THE INVENTION

Problems to be Solved by the Invention

The first object of the present invention is to provide a packaged solid object which are sealed with small gap between a solid object and a packaging when the solid object is held and sealed, and are presented sufficient pore between the solid object and the packaging when the packaging is opened.

The second object of the present invention is to provide a method for packaging a solid object which can hold the solid object sealed in a packaging without the process of sealing in vacuum device, and moreover, can reduce the gap between the solid object and the packaging when the packaging is sealed.

Means for Solving Problems

The present invention basically dare to introduce a replacement gas, which has a property to be absorbed by a solid object, into a packaging when the solid object is sealed and held in the packaging. Therefore, the replacement gas is absorbed by the solid object after sealing, such that the gap between the solid object and the packaging becomes small and then the solid object and the packaging are in an adherence state. Then volume of a packaged product maintains a given state when the absorption of replacement gas comes to equilibrium state. Meanwhile, the gap occurs between solid objects and the packaging when the packaged product is opened.

The solid object and the packaging preferably are in an adherence state in order that it prevent a damage to the solid object during transportation. Because, if a plurality of solid objects are packaged in a packaging, in case of much space in the packaged product, solid objects move there, and then solid objects would collide with each other or with the packaging. Meanwhile, the gap between solid objects and the packaged product is preferably greater so that solid objects can be taken out easily when the packaged product is opened. The present invention can reduce the gap in the packaged product as few as possible at time of sealing, and can adjust to be produced the sufficient gap between solid objects and the packaged product when the packaged product is opened.

The first aspect of the present invention relates to a packaged product comprising a solid object and a packaging which seals and holds the solid object. The packaged product is that a replacement gas is contained in a space sealed in the packaging when it's sealed, and the solid object is made to absorb a part of or all of the replacement gas.

The preferred embodiment of the first aspect of the present invention is the packaged product wherein the solid object and the packaging are in an adherence state by making the solid object absorb a part of or all of the replacement gas.

The preferred embodiment of the first aspect of the present invention is the packaged product wherein the replacement gas contains a gas having a property to be absorbed by the solid object.

The preferred embodiment of the first aspect of the present invention is the packaged product wherein the replacement gas contains from 1 volume % to 100 volume % of carbon dioxide.

The preferred embodiment of the first aspect of the present invention is the packaged product wherein the replacement gas contains from 20 volume % to 100 volume % of carbon dioxide.

The preferred embodiment of the first aspect of the present invention is the packaged product wherein the solid object sealed in the packaging is made to absorb the replacement gas in order that volume of the packaged product can be from 1 volume % to 99 volume % against volume at time of sealing. In the present specification, unless otherwise noted, "the volume of the packaged product is X volume % of the packaged product against volume at time of sealing" could be indicated as the volume of packaged product containing solid objects if the volume of the packaged product containing the solid were 100% when the packaging is sealed without the replacement gas.

The preferred embodiment of the first aspect of the present invention is the packaged product wherein the solid object sealed in the packaging is made to absorb the replacement gas in order that volume of the packaged product can be from 10 volume % to 99 volume % against volume at time of sealing.

The preferred embodiment of the first aspect of the present invention is the packaged product wherein the solid object sealed in the packaging is made to absorb the replacement gas in order that volume of the packaged product can be from 50 volume % to 99 volume % against volume at time of sealing.

In the preferred embodiment of the first aspect of the present invention, the solid object contains proteins.

In the preferred embodiment of the first aspect of the present invention, the solid object is a confectionary, a freeze-dried product, medicine, or solid milk.

In the preferred embodiment of the first aspect of the present invention, the solid object is solid milk.

The preferred embodiment of the first aspect of the present invention is the packaged product having a plurality of arranged solid objects that are held in one packaging.

The preferred embodiment of the first aspect of the present invention is packaged product wherein the packaging comprises a metal film, a first resin film formed on an upper-surface of the metal film and a second resin film formed on a lower-surface of the metal film, wherein the metal film is an aluminum foil film, an aluminum deposited film, an alumina deposited film, or a silica deposited film.

In the preferred embodiment of the first aspect of the present invention, the first resin film and the second resin film, which may be the same or different, are any one of the film or laminated film with two or more films which are selected from a polyethylene terephthalate film, a polypropylene film and a nylon film.

The second aspect of the present invention relates to a method for sealing and packaging a solid object by a packaging. The method comprises the step of sealing the packaging such that the solid object is held while exposing the solid object to replacement gas, which is absorbed by the solid object, and making the solid object sealed in the packaging absorb the replacement gas.

In the preferred embodiment of the second aspect of the present invention, the solid object and the packaging are in an adherence state by making the solid object absorb a part of or all of the replacement gas.

The preferred embodiment of the second aspect of the present invention is the method wherein the replacement gas contains a gas having a property to be absorbed by the solid object.

The preferred embodiment of the second aspect of the present invention is the method wherein the replacement gas contains from 1 volume % to 100 volume % of carbon dioxide.

The preferred embodiment of the second aspect of the present invention is the method wherein the replacement gas contains from 20 volume % to 100 volume % of carbon dioxide.

The preferred embodiment of the second aspect of the present invention is the step of making the solid object sealed in the packaging absorb the replacement gas is a step which makes the solid object sealed in the packaging absorb the replacement gas in order that the volume of the method can be from 1 volume % to 99 volume % against volume at time of sealing.

The preferred embodiment of the second aspect of the present invention is the step of making the solid object sealed in the packaging absorb the replacement gas is a step which makes the solid object sealed in the packaging absorb the replacement gas in order that the volume of the method can be from 10 volume % to 99 volume % against volume at time of sealing.

The preferred embodiment of the second aspect of the present invention is the step of making the solid object sealed in the packaging absorb the replacement gas is a step which makes the solid object sealed in the packaging absorb the replacement gas in order that the volume of the method can be from 50 volume % to 99 volume % against volume at time of sealing.

In the preferred embodiment of the second aspect of the present invention, the solid object contains proteins.

In the preferred embodiment of the second aspect of the present invention, the solid object is a confectionary, a freeze-dried product, medicine, or a solid milk.

In the preferred embodiment of the second aspect of the present invention, the solid object is solid milk.

The preferred embodiment of the second aspect of the present invention is the method wherein a plurality of arranged solid objects are held in one packaging.

The preferred embodiment of the second aspect of the present invention is the method wherein the packaging comprises a metal film, a first resin film formed on an upper-surface of the metal film and a second resin film formed on a lower-surface of the metal film, wherein the metal film is an aluminum foil film, an aluminum deposited film, an alumina deposited film, or a silica deposited film.

The preferred embodiment of the second aspect of the present invention is the method wherein the first resin film and the second resin film, which may be the same or different, are any one of the film or laminated film with two or more films which are selected from a polyethylene terephthalate film, a polypropylene film and a nylon film.

The preferred embodiment of the second aspect of the present invention is the method wherein the step of sealing the packaging comprises the step of arranging a plurality of the solid objects, and sealing the packaging that makes the packing hold the plurality of the solid objects with supplying the replacement gas in a manner that the replacement gas is supplied to the surface of the plurality of the solid objects and seals the packing with the replacement gas being supplied into the space between the plurality of the solid objects and the packaging. The step of sealing comprises the packaging with supplying the replacement gas to a space, which occurs when the solid object is packaged in the packaging, after the plurality of the solid objects are packaged by the packaging, while the replacement gas is supplied in order that the replacement gas can be radiated onto the plurality of the solid object.

The preferred embodiment of the second aspect of the present invention is the method wherein the step of making the solid object sealed in the packaging absorb carbon dioxide is a step of retaining the solid object with sealing in the packaging 1 second to 1 month.

Effect of Invention

The method in accordance with the present invention can easily provide to hold a solid object in the packaging without a process of sealing in vacuum device. Moreover, the solid object is irrefrangible at the time of transportation because when the packaging is sealed, the gap between the solid object and the packaging is reduced. And the solid object also becomes easy to take out of the packaged product because when the packaged product is opened, an excessive fold wouldn't be formed in the packaged product.

DESCRIPTION OF EMBODIMENTS

Figure 1:
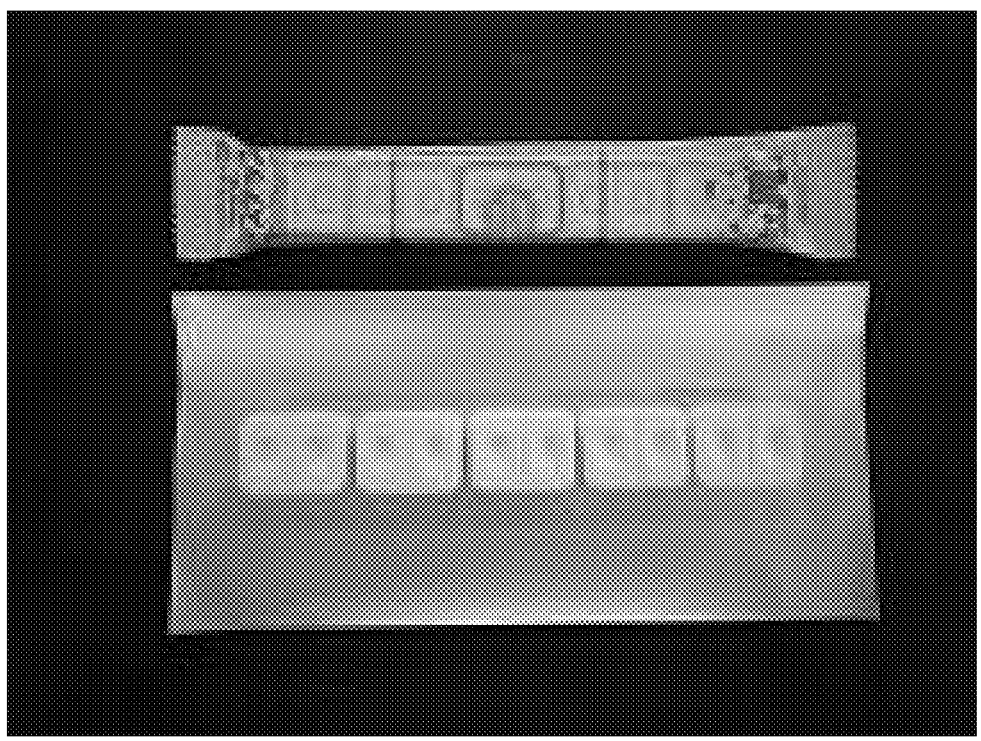
FIG. 1 is a photograph instead of a figure showing the example of the packaged product.

The present invention provides a method for sealing and packaging a solid object. The method of the present invention comprises a step of sealing a packaging to hold the solid object with bringing a replacement gas absorbed by the solid object into contact with the solid object (sealing process) and a step of making the solid object, which is sealed in the packaging, absorb the replacement gas. (absorbing process).

In this method, the solid object and the packaging are preferably in an adherence state by making the solid object absorb a part of or all of the replacement gas. The adherence state between the solid object and the packaging means a packaged product of a few gaps. An example of a packaged product of a few gaps is, for example, when 4 or 5 solid objects are held in one packaged product and then this packaged product is changed to the direction of piling the solid object (for example, in case that a lateral direction is changed to a longitudinal direction for a stick packaged product), the solid object wouldn't move at all or move only from 0 to 0.05 L (preferably from 0 to 0.01 L) if the longitudinal length of solid object was defined L.

Sealing Process

Sealing process is the step of sealing a packaging to hold the solid object with bringing a replacement gas, which has a property to be absorbed by the solid object, into contact with the solid object.

The replacement gas having a property to be absorbed by the solid object is a gas used for replacing a gas, which is inside the solid object or in solid object existential system, with other gas. The replacement gas has at least the property to be absorbed by the solid object and may be the gas that can be replaced with oxygen or air. The replacement gas, for example, according to a type, the number of pieces and a shape of a solid object, may be selected. Oxygen affects a preservative quality of a solid object, so that an oxygen concentration within the packaged product preferably is as few as possible. That is, the example of the gas, which is replaced, within the packaged product or in solid object existential system is oxygen gas. Volume concentration of oxygen gas in the aerial which is contained within the sealing system for the packaged product is, for example, preferably 2 volume % or less, more preferably 1 volume % or less.

The example of the replacement gas contains from 1 volume % to 100 volume % of carbon dioxide. If the replacement gas contains carbon dioxide, examples of the concentration of carbon dioxide may be from 10 volume % to 100 volume %, from 20 volume % to 100 volume %, from 30 volume % to 100 volume %, from 30 volume % to 90 volume %, from 10 volume % to 50 volume %, from 50 volume % to 90 volume %, or from 31 volume % to 38 volume %. That is, as mentioned above, a mix ratio or a composition of the replacement gas may be adjusted according to a type, the number and a shape of a solid object. As described below, if it seal and package the product that have at least 10 weight % or more of a milk-derived ingredient as solid milk, the replacement gas containing carbon dioxide is preferably used as mentioned above. To contain carbon dioxide, the solid object can be made to absorb the replacement gas suitably.

The replacement gas may contain a noble gas or a nitrogen. The example of the noble gas is argon gas. The replacement gas preferably consists of the gas of carbon dioxide and nitrogen.

The solid object may be a solid object having a shape of a certain level of size. Examples of solid objects are a freeze-dried product, a confectionary, medicine, and solid milk. The example of medicine is a tablet. Another example of the solid object is a medical appliance. The solid object of the present invention is, for example, amino acids, peptides or proteins is contained preferably from 1 weight % to 50 weight %, and may be from 5 weight % to 30 weight %, from 5 weight % to 20 weight % or from 10 weight % to 30 weight %. Amino acids, peptides or proteins have a property of absorbing carbon dioxide but the amount of absorbing carbon dioxide changes enormously according to a method for manufacturing a solid object, and so the compounding amount only have to be adopted depending on the volume of the absorbed the replacement gas.

The amount of absorbing the replacement gas can be adjusted by changing carbon dioxide concentration according to the surface condition (e.g. gaps and pore) of the solid object in accordance with the present invention.

The solid object in accordance with the present invention may be, for example, medicine comprising a excipient, a tablet and a confectionary whose shape is like a tablet. Examples of the excipients are dispersing agents, inert diluents, granulating agents, disintegrating agents, binders and lubricants. Examples of the dispersing agents are potato starch and sodium starch glycolate. Examples of diluents are calcium carbonate, sodium carbonate, lactose, microcrystalline cellulose, calcium phosphate, calcium hydrogen phosphate and sodium phosphate. Examples of granulating and disintegrating agents are corn starch and alginic acid. Examples of binders are gelatin, acacia, pregelatinized corn starch, and polyvinylpyrrolidone, and hydroxypropyl methylcellulose. Examples of lubricants are magnesium stearate, stearic acid, silica and talc. These excipients have a different amount of gas absorption, and so the compounding amount only has to be adjusted suitably to be a desired amount of gas absorption. The solid object of the present invention may be a hard capsule.

The solid object in accordance with the present invention preferably is that one solid object has a property of absorbing nitrogen or carbon dioxide of from 0.1 ml to 10 ml. The solid object in accordance with the present invention may absorb nitrogen or carbon dioxide of from 0.5 ml to 10 ml, from 1 ml to 5 ml or from 1 ml to 3 ml. For example, an amount of the gas absorbed by the solid object can be changed by adjusting a material, a porosity, a surface condition and a shape of the solid object.

An example of the solid object shape is tablet shape. More specifically, it's a rectangular parallelepiped, a rectangular parallelepiped which is rounded off the corners, a cube and a cube rounded off the corners. An example of the solid object volume is from $0.5 \text{ cm}^3$ to $50 \text{ cm}^3$ and may be from $1 \text{ cm}^3$ to $10 \text{ cm}^3$ or from $1 \text{ cm}^3$ to $5 \text{ cm}^3$. The solid object may be suitably provided with a recess portion to absorb the gas easily.

In the present invention, a plurality of arranged solid objects is preferably held in one packaged product. The number of solid objects contained in one packaged is, for example, from 1 piece to 10 pieces and may be from 3 pieces to 6 pieces or from 4 pieces to 5 pieces.

Next, it would be described as the example of solid milk which is a preferred solid object in accordance with the present invention. A composition of the solid milk described below can be suitably applied to the solid object of the present invention.

The term "solid milk" means a kind of milk prepared to a state of a solid object at room temperature. More specifically, the solid milk is formed by powdered milk to a given size and weight, which means that a thing dissolving milk powder in water is the same as the solid milk dissolved in water. An example of solid milk is tablet milk (solid object state). The solid milk is intended to be fed to baby as usually dissolving it. Therefore, the milk made by dissolving the solid milk is preferably taste like breast milk. That is, for example, the solid milk is fed to newborn or baby as dissolving by warm water instead of breast milk. In addition, the solid object also may be the solid object to be blended with a coffee or tea instead of powdered milk.

In preferred embodiment of the solid milk of the present invention, the volume is from $1 \text{ cm}^3$ to $50 \text{ cm}^3$. The solid milk of the present invention has a larger volume and can be easily measured to a suitable amount and can be transported conveniently in comparison with conventional powdered milk.

In preferred embodiment of the solid milk of the present invention, the fracture strength is from 30 N to 300 N when the solid milk, which forms a rectangular parallelepiped, is fractured by a load to short axis direction. This embodiment has higher hardness, so it can prevent to break the solid milk at time of transportation. On the other hand, if the solid milk has a scored line, the solid milk can be broken along the scored line because the solid milk has the hardness of the above range.

A preferred embodiment of the solid milk of the present invention is the solid milk manufactured with only powdered milk.

In the present specification, "from A to B" means no less than A and no more than B.

In the present specification, the term "porosity" means the ratio of pore volume in the bulk volume of a powder (for example, see Miyajima Koichiro, Ed., Development of Drugs (Vol. 15), published by Hirokawa Shoten (1989), p. 240), more specifically a value measured by the method for "Measuring Porosity of Solid milk" in the below-described test example.

In the present specification, the term "powdered milk" means a modified milk obtained by mixing fat-soluble components such as milk fat and vegetable fat with water-soluble components such as water, sugars, proteins (including peptides and amino acids), and minerals, and drying to obtain a powder. Examples of powdered milk include whole powdered milk, modified powdered milk, and creamy powder.

In the present specification, the term "additive" means agents other than nutritional components such as a binder, a disintegrating agents, a lubricant, and an expanding agents.

In the present specification the expression "substantially no additives are added" means that basically only powdered milk is used as an ingredient and relates to the case where the additives are added in an amount producing no effect on nutritional components of solid milk, for example, in an amount of 0.5 weight % or less (preferably 0.1 weight % or less). Furthermore, in accordance with the present invention, it is preferred that only powdered milk be used as an ingredient and that additives other than powdered milk be not used.

The solid milk in accordance with the present invention may have many pores (holes). When the cross section of the solid milk of the present invention are observed by a scanning electron microscope (SEM) photograph, a curing layer is observed as a husk state in close location to the surface and a powdered milk is observed as a walnut state inside the curing layer. In addition there are many small pores (holes) in the curing layer and large pores (holes) inside the curing layer. Observing the solid milk surface of the present invention, uneven of the curing layer is observed as sea island form and there are many pores (holes)

The solid milk in accordance with the present invention preferably is solid milk with a porosity of from 30% to 50%. The higher the porosity becomes, the higher the solubility becomes, but the lower the strength becomes. Furthermore, if the porosity is small, solubility decreases. The porosity is mainly controlled by the compacting force in the compacting process. Furthermore, in accordance with the present invention, the preferred porosity is from 35% to 50%, but the porosity may be adjusted according to the application of the solid milk and may be from 30% to 35%, from 30% to 45%, from 40% to 45%, or from 40% to 50%. As described below, if the porosity is within those ranges, good solid milk free from problems of oil-off or the like can be obtained.

The porosity of solid milk may be found by the following formula.

Porosity (%)=$(1-W/PV)\times 100$

W: weight of solid objects (g);
P: density of solid objects measured by using a Beckman air-type density meter (g/cm$^3$);
V: volume calculated by measuring the diameter and thickness of solid objects with a micrometer (cm$^3$).

Preferably there are a plurality of pores (holes) in the solid milk. The individual pores (holes) are preferably dispersed uniformly in the solid milk. Because the pores are almost uniformly distributed in the solid milk, a higher solubility can be obtained. The larger are the pores, the easier water penetrates therein and a high solubility can be obtained. On the other hand, if the pore size is too large, strength decreases or the surface of solid milk becomes rough. Accordingly, the pore size is, for example, from 10 μm to 500 μm, preferably from 50 μm to 300 μm. Such pore size can be measured by well-known means, for example, by observing the surface and cross section of solid milk with a scanning electron microscope. In addition the solubility of the solid milk may be measured in the following manner. First, 100 ml of water is placed into a glass container having a capacity of 200 ml and equipped with a lid and the temperature is set to 50.degree.C. One piece of solid milk is placed into the water, immediately followed by shaking, and the time required for the complete dissolution of solid milk is measured. Shaking conditions are as follows: 1.5 reciprocal movements per 1 sec with amplitude of 30 cm. The solubility of the solid milk can be decided at such evaluation condition.

The components of solid milk are basically identical to those of powdered milk serving as an ingredient therefor, with the exception of the amount of water. Examples of solid milk components include fats, sugars, proteins, minerals, and water. The content ratio of fat in the solid milk is, for example, from 5 weight % to 70 weight %, preferably from 5 weight % to 50 weight %, even more preferably from 10 weight % to 45 weight %.

The solid milk in accordance with the present invention may contain emulsified fat or free fat as fat. Thus, in the conventional powdered milk or solid milk, problems were associated with the free fat spoiling the taste and floating on the water (oil-off) when the milk was dissolved in warm water and, therefore, the free fat was actively removed. It is preferred that the solid milk in accordance with the present invention proactively contain the free fat. This free fat is effectively employed in place of a lubricant and the like. As a result, the present invention makes it possible to manufacture good solid milk, without using additives. However, if the amount of free fat is too high, it raises the oil-off problem. Accordingly, the content ratio of free fat in the solid milk in accordance with the present invention is, for example, from 0.5 weight % to 4 weight %, preferably from 0.7 weight % to 3 weight %, more preferably from 1 weight % to 2.5 weight %. This is because if the content ratio of free fat is within those ranges, good hardness and solubility are obtained and excess oil-off is inhibited, as will be shown in the below-described embodiments. Furthermore, the amount of free fat at which oil-off becomes a problem differs depending on the fat composition and physical properties such as fat globule diameter in the powdered milk used as an ingredient. Therefore, the amount of free fat contained in the solid milk may be appropriately corrected within the above-described ranges.

The free fat content ratio was measured in the following manner. First, the solid milk was finely triturated with a cutter, with heeding so as not to grind it down entirely (triturating process). Then, the ground solid milk was passed through a 32 mesh sieve (sieving) process. The milk that passed through the sieve and the sieving process was used as a sample, and the content ratio of free fat was measured by the method described in "Determination of Free Fat on the Surface of Milk Powder Particles", Analytical Method for Dry Milk Products, A/S NIRO ATOMIZER (1978). The content ratio of free fat determined by this method was represented by weight % of the fat extracted with carbon tetrachloride under shaking at constant rate within the prescribed time.

If the moisture content in solid milk is high, stability in storage is degraded, and if the moisture content is low, the solid milk becomes brittle. Therefore, the content ratio of moisture in the solid milk is, for example, from 1 weight % to 4 weight %, preferably from 2 weight % to 3.5 weight %.

The shape of the solid milk in accordance with the present invention is not limited, provided it has a certain size. Thus, the solid milk may have the shape of round rods, elliptical rods, rectangular parallelepipeds, cubes, plate, balls, polygonal rods, polygonal cones, polygonal pyramids, and polyhedrons. From the standpoint of convenience of handling, the shape of round rods or tetragonal rods is preferred. Furthermore, in order to prevent the solid milk from fracturing, it is preferred that the corner portions be rounded.

It is preferred that one piece or several pieces (preferably, one piece) of the solid milk in accordance with the present invention produce one serving for drinking when dissolved in warm water. Therefore, the volume of the solid milk is, for example, from 1 cm$^3$ to 50 cm$^3$, preferably from 2 cm$^3$ to 30 cm$^3$, more preferably from 4 cm$^3$ to 20 cm$^3$.

The solid milk in accordance with the present invention has to have a certain strength to prevent it from fracturing during transportation. The solid milk in accordance with the present invention preferably has a hardness of 40 N or higher, preferably 50 N or higher, under the below-described hardness measurement. On the other hand, from the standpoint of solubility, the solid milk with hardness of 300 N or less is preferred.

The tablet hardness of solid milk may be measured with a hardness tester manufactured by Fujiwara Seisakusho Co. Thus, a load is applied in the direction in which the surface area of the fracture surface of the sample become minimal and the load at the time of fracture may be measured.

A method for manufacturing the solid milk in accordance with the present invention comprises a compacting process for compacting powdered milk and obtaining a solid object compacted body of the powdered milk, a humidification process for humidifying the compacted body of powdered milk obtained in the compacting process, and a drying process for drying the compacted body of powdered milk obtained in the humidification process.

The compacting process is the process for compacting powdered milk and obtaining a solid object compacted body of the powdered milk. In the compacting process, a compacted body of the powdered milk maintaining pores for water permeation is obtained by tableting the powdered milk under a comparatively low pressure sufficient for transferring the powdered milk to the next process. In the compacting process, the powdered milk is compacted so as to satisfy the condition of manufacturing a compacted body of powdered milk that is provided with adequate pores and has an ability to retain a shape. Thus, the porosity in the compacting process is directly related to the porosity of solid milk. Furthermore, poor lubricating ability of the compacted body of powdered milk can cause troubles in making tablets, such as the adhesion of part of the compacted body of powdered milk to the equipment such as a tablet machine. Moreover, a problem associated with poor shape retaining ability of the compacted body of powdered milk is that it will not retain its shape in the process of manufacturing the solid milk.

It is preferred that only powdered milk be used as an ingredient in the compacting process and substantially no additives are added. A commercial powdered milk can be purchased or it may be manufactured by well-known manufacturing methods (for example, manufacturing methods described in Japanese Patent Laid-open Publication Nos. H10-262553, H11-178506, 2000-41576, 2001-128615, 2003-180244, and 2003-245039). Examples of powdered milk compositions are the same as those of the above-described solid milk. A fat may be added to the ingredient of the compacting process. However, if a fat is added, this fat becomes an oil-off base. Furthermore, because the fat added to the milk adheres to the powdered milk surface, the die filling accuracy is decreased. Therefore, powdered milk manufactured so as to contain the target quantity of free fat is preferably used in the compacting process.

When the content ratio of fat in the powdered milk is high, a small compacting force can be used. On the other hand, when the content ratio of fat in the powdered milk is small, the compacting force has to be increased. Therefore, using powdered milk with a high content ratio of fat makes it possible to satisfy the condition of manufacturing a compacted body of powdered milk that is provided with adequate pores and has an ability to retain a shape. From such standpoint, the content ratio of fat in the powdered milk can be, for example, from 5 weight % to 70 weight %, preferably from 5 weight % to 50 weight %, more preferably from 10 weight % to 45 weight %.

As mentioned above, the powdered milk preferably contains free fat. In accordance with the present invention, this free fat is effectively employed in place of a lubricant and so on. As a result, good solid milk can be manufactured without adding any additive. In the solid milk in accordance with the present invention, the content ratio of free fat is, for example, from 0.5 weight % to 3 weight %, preferably from 0.7 weight % to 2.4 weight %, more preferably from 1 weight % to 2 weight %.

If the moisture content of the powdered milk is high, stability in storage is degraded, and if the moisture content is low, the powdered milk becomes brittle (an ability to retain a shape is degraded). Accordingly, the moisture content ratio in the powdered milk is, for example, from 1 weight % to 4 weight %, preferably from 2 weight % to 3.5 weight %.

In the compacting process, the compacted body of powdered milk is manufactured with compacting means for compacting the powdered milk and obtaining a solid object compacted body of powdered milk. The compacting means is not limited, provided that it can compact powdered milk and produce a solid object compacted body of the powdered milk. Well-known pressure molding machines such as a tablet machine and a compacting testing machine can be used as the compacting means, and among them the tablet machine is preferred. Examples of suitable tablet machines are described in Japanese Examined Patent Publication No. S33-9237, Japanese Patent Laid-open Publication Nos. S53-59066, H6-218028, 2000-95674, and Japanese Patent No. 2650493.

When a powdered material is compacted by using a tablet machine, the powdered material is introduced into a die, a compacting force is applied to the powdered material with a punch, and a solid object shape is obtained. If the powdered material has poor lubricating ability, the powdered material sometimes sticks to the punch surface. This not only degrades the product quality, but also makes it necessary to clean the punch surface, thereby decreasing the yield. For this reason, a lubricant is usually added, in particular in drug manufacture. However, the lubricant is a wax with poor solubility in water. Therefore, the addition of a lubricant is undesirable when a product is consumed after dissolving in warm water, as in the case of solid milk. This is one of the reasons why solid milk is difficult to manufacture. As described above, in accordance with the present invention, an appropriate amount of free fat, which has heretofore been considered as an undesirable component, is used as a lubricant, thereby preventing the powdered milk from sticking to the punch. Furthermore, as described above, producing a compacted body of powdered milk having the adequate porosity makes it possible to obtain readily soluble solid milk that excels in shape retaining ability. Furthermore, the addition of disintegrating agents causes the formation of sediment, but in the method for manufacturing solid milk in accordance with the present invention, the disintegrating agents is unnecessary. Therefore, this problem can be effectively resolved.

Ambient temperature in the compacting process is not limited, and the process can be carried out at room temperature. More specifically, the ambient temperature in the compacting process is, for example, from 10.degree.C. to 30.degree.C. Humidity in the compacting process can be, for example, from 30% RH to 50% RH. It is preferred that the powdered milk compaction operation be conducted continuously in the compacting process.

The humidification process, such as placing in from 60% RH to 100% RH environment for 5 sec to 1 hour, is conducted to wet the compacted body of powdered milk which is obtained in the compacting process. Wetting the compacted body of powdered milk, the compacted body of powdered milk dissolves and bridges. In this case, since the humidity doesn't carry to an inside of the compacted body of powdered milk, the effect of humidification is limited to a close location to the surface of the compacted body of powdered milk. That is, the structure of the surface part and the center part results in difference.

In the humidification process, the compacted body of powdered milk can be wetted with humidification means for wetting the compacted body of powdered milk. Examples of humidification means include well known humidification means such as a high-humidity chamber, a sprayer, and steam. Furthermore, a method of placing in a high-humidity environment, a method of spraying water with a sprayer, and a method of blowing steam can be employed as the humidification means. Humidity of the high-humidity environment is, for example, from 60% RH to 100% RH, preferably from 80% RH to 100% RH, more preferably from 90% RH to 100% RH. The duration of treatment under the high-humidity environment is, for example, from 5 sec to 1 h, preferably from 10 sec to 20 min, more preferably from 15 sec to 15 min. The temperature in the method of placing under high-humidity environment is, for example, from 30.degree.C. to 100.degree.C., preferably from 40.degree.C. to 80.degree.C. In addition, it is preferred that humidification environment, time, temperature and so on are adjusted suitably depending on a size or a shape of the compacted body of powdered milk so as to an effect of the humidification is restricted to a proper range located close to the surface of the compacted body of powdered milk. For example, if the compacted body of powdered milk forms a rectangular parallelepiped with 1 cm or more on a side and from 1 $cm^3$ to 50 $cm^3$ of volume, it will be preferably from 60% RH to 100% RH, from 5 second to 1 hour and from 30.degree.C. to 100.degree.C.

The drying process is conducted to place on the tray and dry the compacted body of powdered milk that was humidified in the humidification process. In the drying process, the compacted body of powdered milk that was humidified in the humidification process is dried.

Well-known methods capable of drying the compacted body of powdered milk that was humidified in the humidification process can be employed as drying methods in the drying process. Examples of suitable methods include a method of placing under a low-humidity and high-temperature atmosphere and a method of bringing into contact with dry air or high-temperature dry air.

"Humidity" in the method involving placing under a low-humidity and high-temperature atmosphere is, for example, from 0% RH to 30% RH, preferably from 0% RH to 25% RH, more preferably from 0% RH to 20% RH. It is thus preferred that humidity be set to as low a level as possible. "Temperature" in the method involving placing under a low-humidity and high-temperature atmosphere is, for example, from 20.degree.C. to 150.degree.C., preferably from 30.degree.C. to 100.degree.C., more preferably from 40.degree.C. to 80.degree.C. "Drying time" in the method involving placing under a low-humidity and high-temperature atmosphere is, for example, from 0.2 min to 2 h, preferably from 0.5 min to 1 h, more preferably from 1 min to 30 min.

As described above, if the moisture content of solid milk is increased, stability in storage thereof is degraded, and if the moisture content is low, the solid milk become brittle. For this reason, in the drying process, the moisture content ratio of the solid milk is controlled to be no more than 1% (more preferably 0.5%) higher or lower than the moisture content ratio of the powdered milk used as the ingredient by adjusting the drying temperature or the drying time.

The method for manufacturing powdered milk and solid milk in accordance with the present invention comprises a process of manufacturing the powdered milk and a process of manufacturing the solid milk by using the powdered milk as an ingredient. Part of the powdered milk manufactured in the process for manufacturing the powdered milk can be placed as is in a container and used as a product. In this way, powdered milk and solid milk can be obtained.

Specific features of methods for the manufacture of powdered milk differ depending on the type of product such as modified milk represented by whole powdered milk, defatted powdered milk, and powdered milk for infants. However, basically, powdered milk can be manufactured by a process of: "ingredient (adjustment)", "clearing, sterilization", "concentration", "(homogenization)", "spray drying", "sieving", "filling" in order. The size of powdered milk after spray drying is about from 5 μm to 150 μm, and the size of the granulated powdered milk is about from 100 μm to 500 μm. Furthermore, after the powdered milk is mixed with granules thereof, the pores obtained have a size of about from 5 μm to 150 μm.

Milk is used as an ingredient for powdered milk. Fresh milk can be used as the milk. More specifically, milk of cows (Holstein cows, Jersey cows, and the like), goats, sheep, and buffalos can be used. The content ratio of fat in the milk can be adjusted by removing part of the fat by centrifugal separation or the like. Furthermore, the below-described nutritional components can be added. On the other hand, when a modified powdered milk is manufactured, the below-described nutritional components are used upon adding to water and mixing.

Powdered milk can be manufactured by treating the aforementioned liquid ingredient, starting material, by processes of "clearing", "sterilization", "homogenization", "concentration", "spray drying", "sieving", and "filling".

Milk proteins and milk protein fractions such as casein, whey proteins (alpha-lactoalbumin, beta-lactoglobulin, and the like), whey protein concentrate (WPC), and whey protein isolate (WPI); animal proteins such as egg protein; vegetable proteins such as soybean protein and wheat protein; peptides of various chain length obtained by decomposing those proteins with enzymes or the like; and amino acids such taurine, cystine, cysteine, arginine, and glutamine can be used individually or in mixtures as proteins serving as ingredients for powdered milk.

Milk fat, lard, animal oils and fats such as beef tallow and fish oil, vegetable oils such as soybean oil, rapeseed oil, corn oil, coconut oil, palm oil, palm kernel oil, safflower oil, cotton seed oil, linseed oil, and MCT, fractionated oils, hydrogenated oils, and transesterified oils thereof can be used individually or in mixtures as oils and fats serving as ingredients for powdered milk.

Lactose, sucrose, glucose, maltose, oligosaccharides such as galacto-oligosaccharides, fructo-oligosaccharides, and lactulose, polysaccharides such as starch, soluble polysaccharides, and dextrin, and artificial sweeteners can be used individually or in mixtures as sugars serving as ingredients for powdered milk. Furthermore, water-soluble or fat-soluble vitamins, minerals, spices, and flavors can be added as ingredients for powdered milk.

The clearing process is to remove fine foreign matter contained in the cow milk or such by well-known means such as a centrifugal separator or a filter.

The sterilization process is to kill microorganisms such as bacteria that are contained in the milk or such. Sterilization temperature and holding time of the sterilization process differ depending on the type of powdered milk, and conditions relating to well-known sterilization treatment can be adopted.

The concentration process is any process for concentrating, e.g., the cow milk in advance prior to the below-described spray drying process; well-known means such as vacuum evaporation tank and conditions can be employed for the concentration process.

The homogenization process is a process for homogenizing the solid object components such as fat globules dispersed in the cow milk. Well-known means and conditions such as causing a liquid, which is to be treated, to pass through a narrow gap under a high pressure can be used in the homogenization process.

The spray drying process is to obtain a powder by evaporating water present in the condensed milk. Well known means such as a spray dryer and well-known methods can be employed in the spray drying process.

The sieving process is to remove particles with a large diameter such as powder aggregates by passing the powder obtained in the spray drying process through a sieve, thereby adjusting the particle size of the powder.

The filling process is to fill a bag or can with the powdered milk. In the method for manufacturing powdered milk and solid milk in accordance with the present invention, after the powdered milk has been manufactured in the above-described manner, the above-described method for manufacturing solid milk can be applied. Thus, the above-described compacting process may be carried out by using as an ingredient the powdered milk that passed through the above-described sieving process.

The solid milk in accordance with the present invention is generally dissolved in warm water and drunk. More specifically, warm water is poured into a container provided with a lid and then the necessary number of pieces of the solid milk in accordance with the present invention is placed therein. It is preferred that the solid milk be rapidly dissolved by lightly shaking the container and drunk in a state with an appropriate temperature.

The solid milk in accordance with the present invention can be widely controlled an amount of gas absorbed by the solid milk by adjusting the surface state.

An example of the packaging can be employed a conventional packaging if this material can seal and package a food or medicine.

The packaging is a material for holding the solid object within and forming the packaged product. An example of the packaging is a thing which contains a metal film, a first resin film formed on an upper-surface of the metal film and a second resin film formed on a lower-surface of the metal film. The upper-surface of the metal film is an outside of the packaging. Examples of the metal film are an aluminum foil film, an aluminum deposited film, an alumina deposited film and a silica deposited film. The film aluminum foil film is preferable among these films. An example of a thickness of the aluminum foil is from 3 μm to 20 μm. The thickness of the aluminum foil may be from 5 μm to 15 μm. The thickness of the aluminum deposited film, the alumina deposited film and the silica deposited film may be, for example, from 300 Å to 100 μm, from 700 Å to 10 μm, or from 800 Å to 10 μm. The alumina deposited film and the silica deposited film are a film which is provided with a barrier layer deposited each alumina and silica on one side of resin film (for example a PET film or a nylon film).

Each of the first resin film and the second resin film may be the same or different. The first resin film and the second resin film may be a single layer or a laminated layer. Examples of the resin film are a film which is formed and processed from polyolefin resins such as polyethylene or polypropylene; polyester resins such as polyethylene terephthalate, polyethylene-2,6-naphthalate, polybutylene terephthalate or copolymers of thereof; polyamide resins such as polyamide6, polyamide66, polyamide12; polystyrene, poly (meth) acrylate acid ester, polyacrylonitrile, polyvinyl acetate, polycarbonate, polyarylate, regenerated cellulose, polyimide, polyetherimide, polysulfone, polyether sulfone, polyether ether ketone, ionomer resin and so on. The resin film may be any one of the film selected from the group which consists of "a polyethylene terephthalate (also called PET or oriented polyester) film, an oriented polypropylene (also called OPP or biaxially-oriented polypropylene) film and oriented nylon (ONy)" and a film which is laminated by 2 or more films selected from the group. Preferred examples of the material of the first resin film and the second resin film are any one of the film selected from the group which consists of "a polyethylene terephthalate film, a polypropylene film and a nylon film"

Example of the step of sealing the packaging is as follows. That is, a plurality of solid objects is arranged. The plurality of solid objects may be conveyed in a row by a conveyer. Then the replacement gas is supplied so that the replacement gas can be radiated onto the plurality of solid objects. Radiating the replacement gas onto the solid object, for example, it is thought that opening the upper part of the solid object conveyed in a row, the replacement gas is radiated on solid objects from a nozzle set in the upper part. In this way, an oxygen gas contained in the solid object can be replaced for the replacement gas effectually. In addition, the solid object may be packaged in seal system consisting of the replacement gas.

An example of the sealing process is that the plurality of solid objects is packaged with the packaging, and then the replacement gas is further provided to an inside of the space that occurs when the solid object is held in the packaging, which is different from the radiating the replacement gas onto the solid object from the nozzle set in the upper part. Thus, not only from the upper part of the solid object convey system but also from the nozzle which is inserted into a space formed by sealing the packaging, the replacement gas is poured, and then at least one edge of the packaging may be sealed. In this example of manufacturing, for example, the packaging is set between the solid object and conveyer which conveys the solid object. And then, the shape of the packaging is transformed as tucking the solid object. In this case, the solid object is covered with a part of the packaging which is present at the down of the solid object and the seam may be sealed with heat. And the edge of the advancing direction or non-advancing direction of the conveyer also may be welded with heat per a given piece so that the given piece of the solid objects can be held in one packaged product.

The absorbing process is the process of a making the solid object absorb a part of or all of the replacement gas. The solid object may absorb a part of or all of the replacement gas. An example of the absorbing process is that the solid object, which is sealed in the packaging, absorbs the replacement gas so that the volume of the packaged product is from 1% to 99% against the volume at time of sealing. The solid object sealed in the packaging may absorb the replacement gas so that the volume of the packaged product is 10% to 99% against the volume at time of sealing. It may be from 50% to 99% (50% to 95%, 60% to 95%, 70% to 95%, 80% to 95%, 50% to 93%, 60% to 93%, 70% to 93%, 80% to 93%, 85% to 93%, 50% to 90%, 60% to 90%, or 70% to 90%).

An example of the absorbing process is a process of retaining the solid object in a state of sealing by the packaging, for example, for a period of 1 second to 1 month. The period of the absorbing process may retain the solid object in storage state, for example, for a period of from 3 days to 2 weeks (from 4 days to 10 days, from 1 week to 10 days).

For example, if the solid object is solid milk, carbon dioxide is absorbed into proteins or amino acid which composes the solid milk. Therefore, if the solid object is solid milk, the replacement gas should include carbon dioxide so as to the replacement gas is absorbed by the solid milk. But then, the amount of the gas absorbed by the solid milk (for example, carbon dioxide) is changed depending on a variety of conditions such as a material of the solid milk, a manufacturing process, a surface roughness, a porosity of the solid milk and a surface state of the solid milk. Thus, the amount of the absorbed replacement gas can be controlled by adjusting a material or a manufacturing process and so on.

The packaged product in accordance with the present invention can be obtained by passing through such as the above manufacturing process.

The present invention also provides a packaged product comprising the solid object. An example of the packaged product comprises a plurality of tablet solid objects in a row and a packaging which seals and holds a plurality of solid objects. And the packaged product holds one or more solid objects. If the packaged product holds a plurality of solid objects, for example, the plurality of solid objects are held in a row. FIG. 1 is the photograph instead of a figure showing the example of the packaged product.

As mentioned above, the packaged product in accordance with the present invention is that a part of or all of the replacement gas which is within the packaging at time of sealing, are absorbed by the solid object. In this way, the gap, which occurs at time of sealing between the solid object and the packaging, is reduced. Thus, volume of the packaged product is reduced from one volume of making the solid object absorb the replacement gas in comparison with volume at time of sealing.

The embodiments are described below and specific features of the present invention are explained. However, the present invention is not limited to those embodiments. The embodiments described below are focused on the solid milk. However, the present invention is not limited to the solid milk. The present invention incorporates embodiments obtained by adequately modifying the following embodiment in a range obvious for one of ordinary skill in art.

Reference Example 1

Manufacturing Powdered Milk

As shown the reference example 1, liquids obtained by adding fat, sugars, proteins, milk, and minerals to water and mixing were treated in a sequence of processes including homogenization, concentration, and spray drying to manufacture powdered milk of various compositions.

TABLE 1

| Composition | Powdered Milk 1 | Powdered Milk 2 |
|---|---|---|
| Protein (%) | 15 | 12 |
| Fat (%) | 18 | 26 |
| Sugar (%) | 60 | 57 |
| Mineral (%) | 4 | 2 |
| Water and other (%) | 3 | 3 |

Reference Example 2

Manufacturing Solid Milk

The solid milk was manufactured from the powdered milk, as an ingredient, obtained by reference example 1 and by compaction molding, humidifying and drying. In humidification process, the Combi oven (FCCM6, manufactured by Fujimach Co.) was used as humidifier. In this case, the compaction molded product of the powdered milk was allowed to stay for 45 sec under conditions of 65.degree.C. at room temperature and 100% RH in humidifier. In drying process, the compaction molded product of the powdered milk was dried for 5 min under conditions of 95.degree.C. and 10% RH in an air thermostat (DK 600, manufactured by Yamato Kagaku Co.) as a drier. In this way, the solid milk was obtained.

Figure 2:
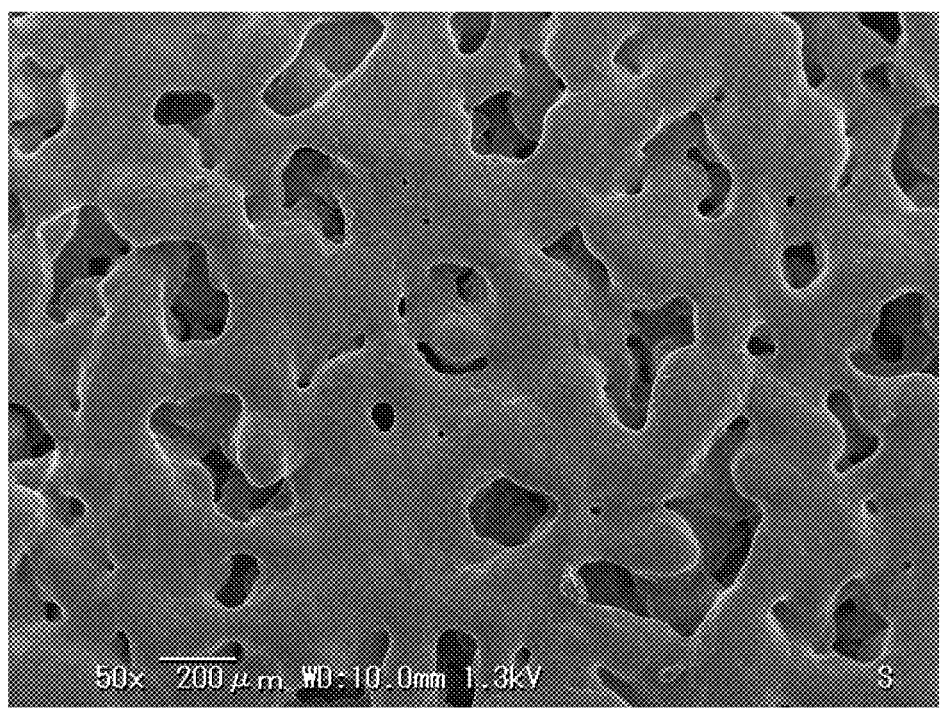
FIG. 2 is a SEM photograph showing the surface condition of the solid milk made from the powdered milk 1 in the example of manufacturing.
Figure 3:
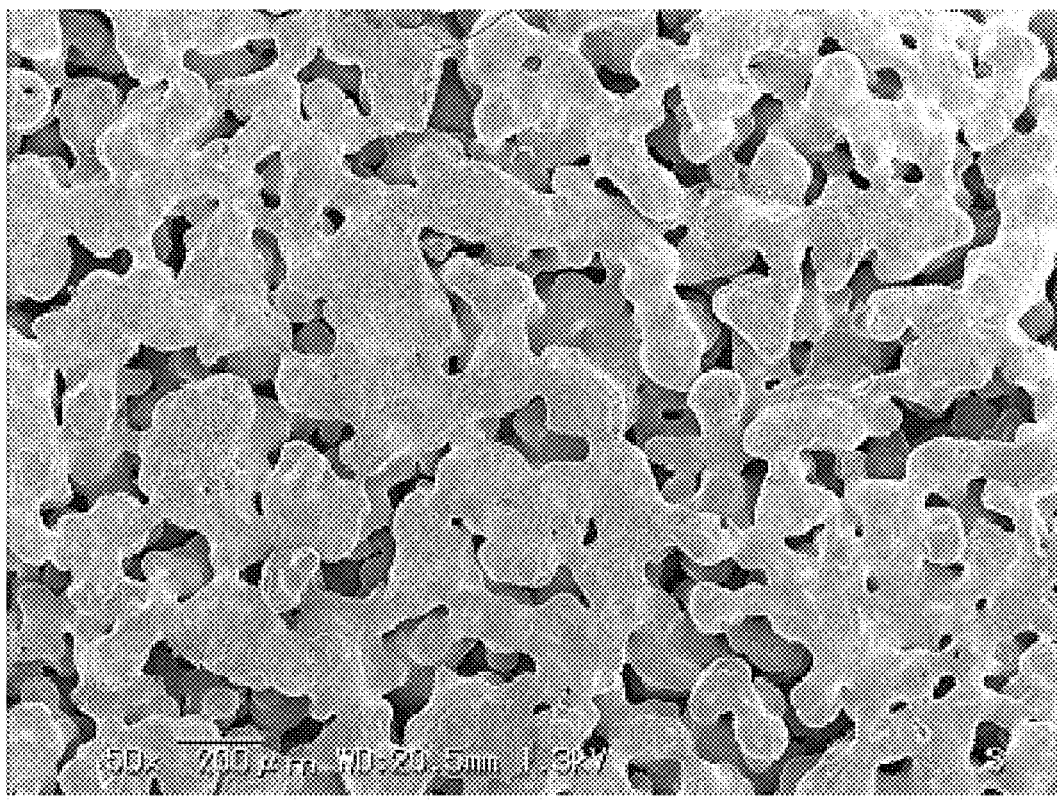
FIG. 3 is a SEM photograph showing the surface condition of the solid milk made from powdered milk 2 in the example of manufacturing.

FIG. 2 and FIG. 3 show a surface condition of the obtained solid milk. FIG. 2 is SEM photograph showing a surface condition of the solid milk manufactured from the powdered milk 1. FIG. 3 is SEM photograph showing a surface condition of the solid milk manufactured from the powdered milk 2.

Example 1

In the following example, ability of impact resistance required for transportation was studied and evaluated using a damaged condition that is the damage of the solid object when a box holding the packaged product have been dropped.

1, 1 Study of a Pillow Film Material from the Standpoint of Stability in Storage Arranging cube solid milk in 4 or 5 series and then packaging by pillow packaging was studied from the standpoint of convenience ability. Thus, applying such package formation, the solid milk can be taken out without direct touch, so it's a sanitary, moreover when the solid milk is taken out, the number of pieces of the solid milk can be adjusted freely depending on the position where it was taken out the pillow.

The pillow film needs to excel in stability in storage. Therefore, the aluminum deposited film, the alumina deposited film and the aluminum foil laminated film was studied as a material of the pillow film. The film thickness of aluminum deposition of 400 Å, 600 Å and 800 Å were prepared as the aluminum deposited film. Any of the aluminum deposited film was the aluminum deposited PET film of which a film thickness is 12 µm. A thickness of the alumina deposited film was 12 µm. The aluminum foil of which a thickness is 7 µm was prepared as an aluminum foil laminated film. The following table 2 shows oxygen permeability and water vapor permeability of these films.

TABLE 2

| Item | Grade | Thickness | Oxygen permeability | Water vapor permeability |
|---|---|---|---|---|
| Aluminum deposited PET | 400 Å | 12µ | 1.0 | 1.4 |
| | 600 Å | 12µ | 0.8 | 1.0 |
| | 800 Å | 12µ | 0.8 | 0.8 |
| Alumina deposited PET | Ultra-high barrier | 12µ | 0.1 | 0.1 |
| Aluminum | Normal | 7µ | 0.0 | 0.0 |

The value of the oxygen permeability is depicted by "cc/m$^2$·day·atmospheric pressure" under conditions of 23.degree.C. and 90% RH. The value of the water vapor permeability is depicted by "g/m$^2$·and·day" under conditions of 40.degree.C. and 90% RH.

Figure 4:
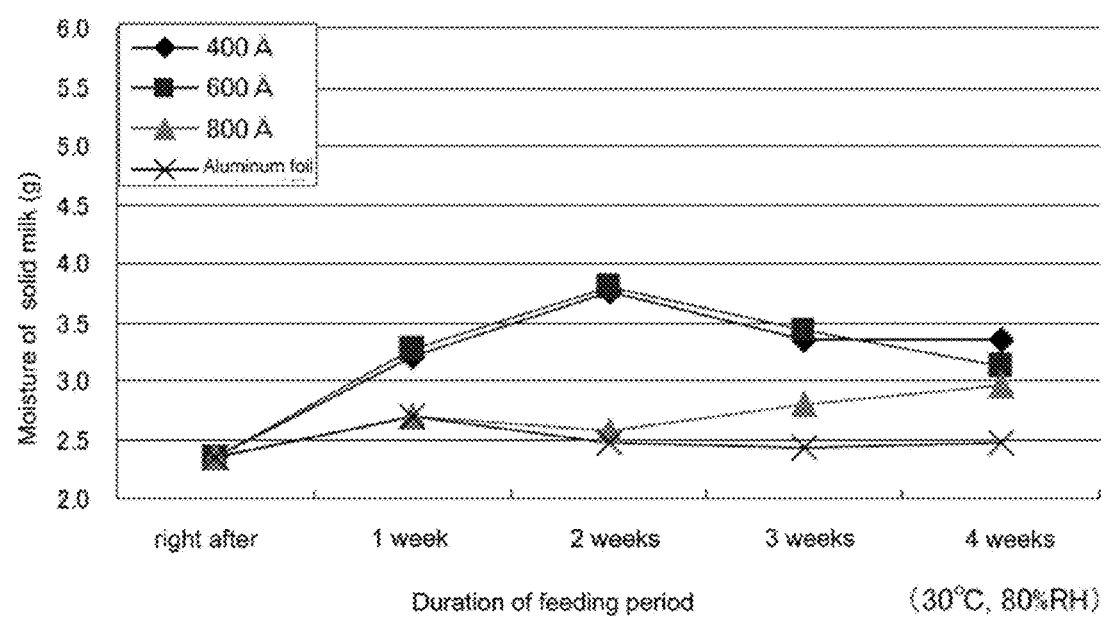
FIG. 4 is a graph instead of a figure showing the moisture of the solid milk packaged with the aluminum deposited film (400 Å, 600 Å, 800 Å) and the aluminum foil laminated film.

In addition, the moisture in the solid milk was measured, which is packaged with an aluminum deposited film, an alumina deposited film and an aluminum foil laminated film shown in table 2. FIG. 4 is a graph instead of a figure showing the moisture of the solid milk packaged with the aluminum deposited film (400 Å, 600 Å, 800 Å) and the aluminum foil laminated film.

The moisture amount of the solid milk which was packaged using the aluminum deposited film increased in comparison with the aluminum foil laminated film. As a result, when a deposited aluminum was thin and a rise of the moisture amount of the solid milk was much, a part of the solid milk changed to brown. On the other hand, the solid milk packaged by the aluminum foil laminated film didn't have a problem of changing to brown and the moisture amount didn't increase. Therefore, it might be said that the aluminum foil laminated film was more excellent packaging for the solid milk in comparison with the aluminum deposited film.

Figure 5:
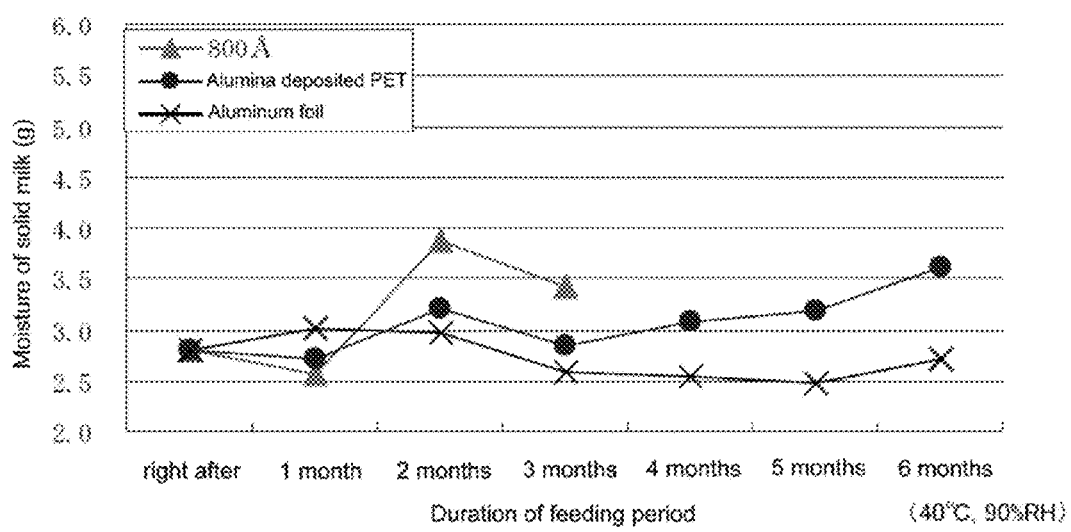
FIG. 5 is a graph instead of a figure showing the moisture of the solid milk packaged with the aluminum deposited film, the alumina deposited film and the aluminum foil laminated film.

A change of the moisture amount of the solid milk packaged using the alumina deposited film was also studied. FIG. 5 is a graph instead of a figure showing the moisture of the solid milk packaged with the aluminum deposited film, the alumina deposited film and the aluminum foil laminated film. As shown FIG. 5, the moisture amount of the solid milk which was packaged with the alumina deposited film also increased in comparison with the aluminum foil laminated film. Therefore, we found that the aluminum foil laminated film was the most preferable from the standpoint of stability in storage.

1, 2 Modifying a Pillow Film Material from the Standpoint of Taking Out Ability and Preventing Wrinkle Aluminum foil typically is easy to wrinkle. Consumers wouldn't prefer a wrinkle product. And when the packaged solid milk is taken out, the packaging is desirable to be opened easily. Thus, the pillow film material was studied from the standpoint of taking out ability and a preventing wrinkle.

As a result of studying the method for preventing wrinkle by making a film stiffness based on the aluminum foil, if the film, which has the configuration of putting an aluminum foil between resin films, is applied, it was found that it could effectively prevent the development of wrinkles and it could be also easy to open to the desired direction. Examples of such resin film are a polyethylene terephthalate (also referred to as PET or oriented polyester) film, an oriented polypropylene (also referred to as OPP or biaxially-oriented polypropylene) film and an oriented nylon (ONy).

Ability of opening, taking out and barrier was evaluated in manufacturing a film combined a variety of materials and pillow packaging with pillow package machine. The material used in evaluation are a PET film, a polyethylene (PE) film, a low density polyethylene (LDPE) film, a linear low density polyethylene (L-LDPE) film, and a biaxially-oriented polypropylene film. And the thickness of the film was also studied. Table 3 shows example of the part of the film composition. Table 4 shows the part of results. The method for evaluation was carried out by 5 research specialists for a long time based on the evaluation criterion showed table 5 and the average value was described. In the following table, PET shows oriented polyester, AL shows aluminum foil, PE shows polyethylene, LDPE shows low density polyethylene, L-LDPE shows linear low density polyethylene, OPP shows oriented polypropylene, ONy shows oriented nylon. The value shows thickness (μm).

TABLE 3

| No. | Composition |
|---|---|
| 1 | PET12/PE15/AL7/PE15/LDPE30 |
| 2 | PET12/PE15/AL7/PE15 |
| 3 | PET14 (easy tearing ability)/PE15/AL7/PE30 |
| 4 | PET12/PE15/AL7/PE30 |
| 5 | PET12/PE16 (easy tearing ability)/AL7/LDPE30 |
| 6 | ONy15/AL deposited PET12/L-LDPE40 |
| 7 | PET16 (perforation process)/PE13/AL7/PE13/LDPE30 |
| 8 | PET16 (perforation process)/AL deposited PET14/PE35 |
| 9 | PET16 (perforation process)/AL deposited PET14/PE13/LDPE30 |
| 10 | PET16 (perforation process)/AL deposited PET14/LDPE30 |
| 11 | PET12/PE15/AL deposited PET12/LDPE30 |
| 12 | PET12/AL deposited PET12/PE16 (easy tearing ability)/LDPE30 |
| 13 | PET12/AL deposited PET14/PE16 (easy tearing ability)/LDPE30 |
| 14 | PET16/(perforation process)/AL7/PET14 (easy tearing ability)/PE35 |
| 15 | PET16/(perforation process)/AL7/PET14 (easy tearing ability)/LDPE30 |
| 16 | PET25/(perforation process)/AL7/PET14 (easy tearing ability)/PE35 |
| 17 | PET25/(perforation process)/AL7/PET14 (easy tearing ability)/LEPE30 |
| 18 | PET16/(perforation process)/AL7/PET14 (easy tearing ability)/PE20/L-LDPE15 |
| 19 | PET19/(perforation process)/AL7/PET14 (easy tearing ability)/PE20/L-LDPE15 |
| 20 | PET16/(perforation process)/AL7/PET14 (easy tearing ability)/LDPE30 (easy tearing ability) |

TABLE 3-continued

| No. | Composition |
|---|---|
| 21 | OPP25/(easy tearing ability)/AL7/PET14 (easy tearing ability)/PE20/L-LDPE15 |
| 22 | OPP25/(easy tearing ability)/AL7/PET14 (easy tearing ability)/LDPE30 |

* Composition is described as outside is left and inside is right

TABLE 4

| No. | Composition | Open | Take Out | Barrier |
|---|---|---|---|---|
| 1 | PET12/PE15/AL7/PE15/LDPE30 | 1 | 2 | 3 |
| 2 | PET14 (easy tearing ability)/PE15/AL7/PE30 | 2 | 2 | 3 |
| 3 | PET12/PE15/AL7/PE30 | 1 | 2 | 3 |
| 4 | PET16 (perforation process)/PE13/AL7/PE13/LDPE30 | 2 | 2 | 3 |
| 5 | PET16/(perforation process)/AL7/PET14 (easy tearing ability)/PE35 | 3 | 2 | 3 |
| 6 | PET19/(perforation process)/AL7/PET14 (easy tearing ability)/PE20/L-LDPE15 | 1 | 1 | 3 |
| 7 | PET16/(perforation process)/AL7/PET14 (easy tearing ability)/LDPE30 (easy tearing ability) | 3 | 3 | 3 |
| 8 | OPP25/(easy tearing ability)/AL7/PET14 (easy tearing ability)/LDPE30 | 2 | 2 | 3 |

* A figure described in the composition is the thickness of the film (unit: μm)

TABLE 5

| | Open ability | Take out ability | Barrier ability |
|---|---|---|---|
| 1 | Easy to open by hand, and opening spout is smooth | Content is easily taken out without entrapping | Oxygen and water vapor don't permeate |
| 2 | Easy to open by hand, but opening spout isn't smooth | Content is easily taken out but entrapping | Oxygen and water vapor permeate slightly |
| 3 | Possible to open by hand | Content isn't easily taken out by entrapping | Oxygen and water vapor permeate |

As shown table 4, particularly film No 7, the opening was easy, the opening spout was smooth and the wrinkle didn't occur in the pillow film. In addition, when the pillow packaging has done, a leak of the sealing part didn't occur and it could be packaged with stability even if it was packaged at high speed.

Evaluation of Ease to Take Out

Figure 6:
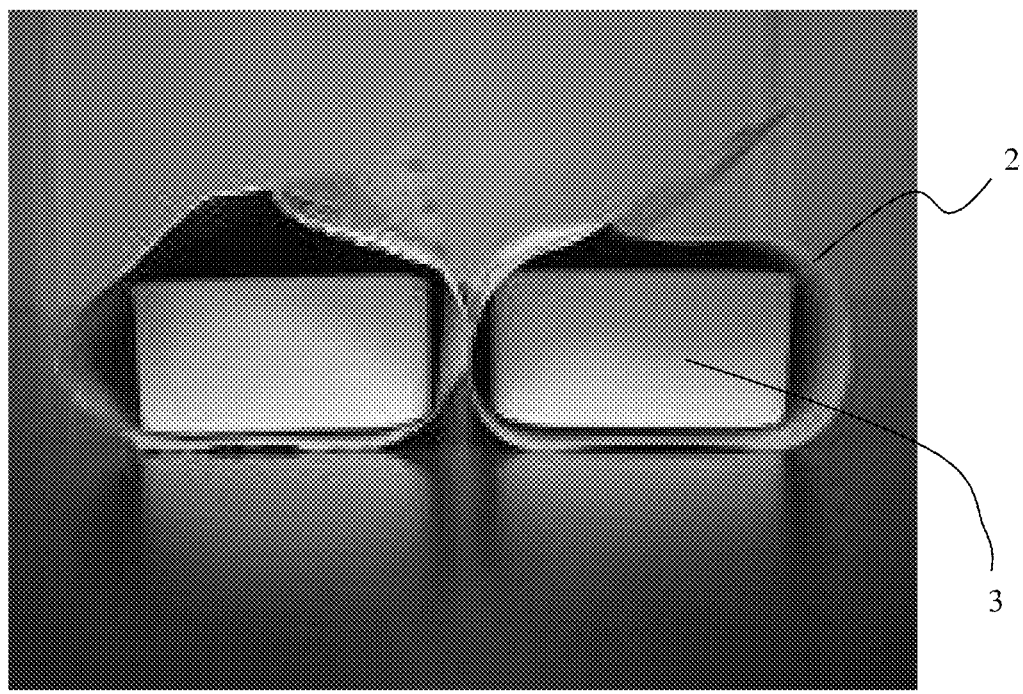
FIG. 6 is photograph instead of a figure showing the condition at opening the packaged product.

The ease to take out was evaluated when the packaged product arranged 4 or 5 pieces of solid milk as a series was manufactured and opened. The packaged product was obtained by sealing the packaging without replacing the replacement gas. In this case, the volume of the packaged product containing 4 pieces of solid milk was 52 ml. On the other hand, the volume of the packaged product containing 5 pieces of solid milk was 62 ml. Then the ease to take out was evaluated after the volume of the packaged product containing the solid milk was adjusted to be constant. The volume of the packaged product was adjusted by absorbing the gas inside the packaged product. The reduced volume of the packaged product corresponds to volume which was reduced as the replacement gas was absorbed by the solid milk. The method for evaluation was carried out by 5 research specialists for a long time by using the evaluation criterion showed table 6 and the average value was described. The results are shown in FIG. 6. FIG. 6 is photograph instead of a figure showing condition at opening the packaged product. As shown in FIG. 6, the packaged product 1 comprises a packaging 2 having one space inside the packaging, and a solid milk 3. As the results, the taking out ability was better when the packaged product after sealing was 46 ml or more in case of 4 pieces and was 56 ml or more in case of 5 pieces.

TABLE 6

| | Volume of the packaged product | Ability of taking out |
|---|---|---|
| 4 pieces | 50 ml | 3 |
| | 48 ml | 3 |
| | 46 ml | 3 |
| | 44 ml | 1 |
| | 42 ml | 1 |
| 5 pieces | 60 ml | 3 |
| | 58 ml | 3 |
| | 56 ml | 3 |
| | 54 ml | 1 |
| | 52 ml | 1 |

| Ability of taking out | |
|---|---|
| 3 | Content is easily taken out without entrapping |
| 2 | Content is easily taken out but entrapping |
| 1 | Content isn't easily taken out by entrapping |

1, 3 Study of Ability of Impact Resistance
1.3.1 Falling Test of a Carton

When a product was made to drop, the influence (damage) on the solid object was checked considering use in transport, store and home. In drop strength test, the condition of damage of the solid milk in the packaged product was studied when the carton containing pillow was dropped from 50 cm height.

As the falling test, three sides of the product was dropped successively from 50 cm height in the long side, the short side and the longitudinal direction order. The drop of the long side direction is assumed that when a flat pile carton dropped. The drop of the longitudinal direction is assumed that when a longitudinal pile carton dropped. The drop test was performed in three varieties of the volume which are the right after packaging (5 pieces/60 ml or 4 pieces/50 ml), the one day after packaging (58 ml or 48 ml), and a given period after packaging (56 ml or 46 ml).

The carton containing 5 pieces was studied 3 times. The carton containing 4 pieces was studied 6 times. The number of broken the solid milk is the result of tests which are performed for 120 packaged products in carton containing 5 pieces, and performed for 360 packaged products in carton containing 4 pieces. In addition, the volumetric reduction rates (which includes the volume of the solid milk and reduces the volume of the solid milk) were calculated from that; the volume in the packaged product was 62 ml when the gap in packaged product containing 5 pieces wasn't processed any reduction; the volume in the packaged product was 47 ml when the gap in packaged product containing 5 pieces wasn't occur and the solid milk was contacted with it; the volume in the packaged product was 52 ml when the gap in packaged product containing 4 pieces wasn't processed any reduction; and the volume in the packaged product was 37 ml when the gap in packaged product containing 4 pieces wasn't occur and the solid milk was contacted with it.

The carton was made from thick paper and the thickness was 1.4 mm. The carton containing 5 pieces was cube for L 126 mm, ×W 98 mm×H 205 mm (L is longitudinal length, W is width and H is height) and the carton containing 4 pieces was cube for L 88 mm, ×W 32 mm×H 173 mm.

Figure 7:
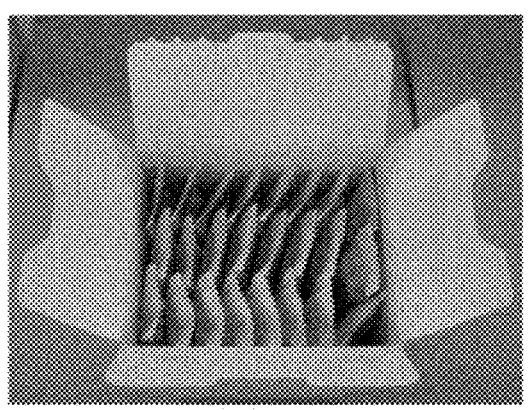
FIG. 7(a) is a photograph instead of a figure showing the condition of that the packaged product is held in the pillow carton containing 5 pieces (which contains the packaged product holding 5 pieces of solid milk which is arranged in 3 rows as 8 packaged products per row in one box).
FIG. 7(b) is a photograph instead of a figure showing the condition of that the packaged product is held in the pillow carton containing 4 pieces (which contains the packaged product holding 4 pieces of solid milk which is arranged in a row as 5 packaged products per row in one box).
Figure 7:
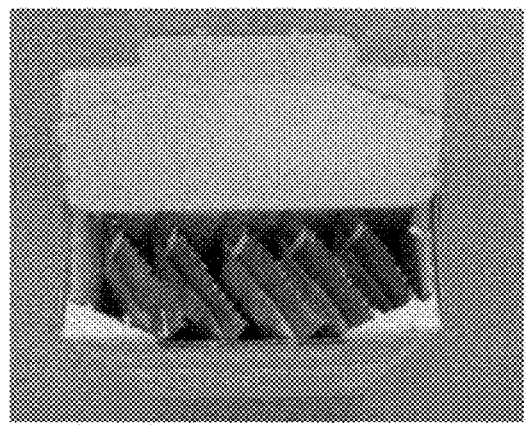

FIG. 7(a) is a photograph instead of a figure showing the condition of that the packaged product is held in the pillow carton containing 5 pieces (which contains the packaged product holding 5 pieces of solid milk which is arranged in 3 rows as 8 packaged products per row in one box). FIG. 7(b) is a photograph instead of a figure showing the condition of that the packaged product is held in the pillow carton containing 4 pieces (which contains the packaged product holding 4 pieces of solid milk which is arranged in a row as 5 packaged products per row in one box).

Table 7 shows the average value of the broken solid object (N=3) in the falling test of the pillow carton containing 5 pieces. Table 8 shows the average value of the broken solid object (N=6) in the falling test of the pillow carton containing 4 pieces. From table 7 and table 8, in accordance with shrinkage of the volume, the number of the broken solid milk was reduced and the solid milk reaching to a given volume was good condition without broken.

TABLE 7

| Volume within the packaged product after sealing ml | Volume rate (include volume of the solid milk) % | Volume rate (reduce volume of the solid milk) % | The number of the broken solid milk piece |
|---|---|---|---|
| 60 | 97 | 87 | 6 |
| 58 | 94 | 73 | 2 |
| 56 | 90 | 60 | 0 |
| 54 | 87 | 47 | 0 |
| 52 | 84 | 33 | 0 |

TABLE 8

| Volume within the packaged product after sealing ml | Volume rate (include volume of the solid milk) % | Volume rate (reduce volume of the solid milk) % | The number of the broken solid milk piece |
|---|---|---|---|
| 50 | 96 | 87 | 2 |
| 48 | 92 | 73 | 1 |
| 46 | 88 | 60 | 0 |
| 44 | 85 | 47 | 0 |
| 42 | 81 | 33 | 0 |

In the above table 7 and table 8, the volume within the packaged product after sealing includes the packaged product and the solid milk. The volume rate (which includes the volume of the solid milk) could be indicated if 62 ml and 52 ml, which are volumes within the packaged product after sealing, were 100%, in case of the packaged product held 5 pieces of the solid and 4 pieces of the solid. The volume rate (which reduces the volume of the solid milk) means the value which subtract 47 ml and 37 ml from volumes within the packaged product after sealing (which corresponds to the volume of the part of the gap in packaged product), in case of the packaged product held 5 pieces of the solid and the packaged product held 4 pieces of the solid. Thus, for the packaged product held 5 pieces of the solid and the packaged product held 4 pieces of the solid, both initial values (100%) of the volume rates (which reduces the volume of the solid milk) were 15 ml.

1, 4 Study of a Flow Rate of the Replacement Gas

Indeed, the pillow packaging was carried out using modified pillow packaging machine. The pillow package machine which has mechanics for replacing a gas in pillow package was used. The mechanics which have the main nozzle for supplying the replacement gas to the inside of the packaging before sealing and the shower nozzle for spraying the replacement gas from the upper part of the solid milk was used. A relation between the flow rate of the main nozzle and the shower nozzle, and the oxygen concentrate and carbon dioxide concentration in package was measured. The results are shown FIG. 9.

TABLE 9

|  | Main nozzle flow rate (L/min) | | | | | | |
| --- | --- | --- | --- | --- | --- | --- | --- |
|  | 1.0 | 2.0 | 3.0 | 5.0 | 7.0 | 12.8 | 14.0 |
| Shower nozzle flow rate (L/min) | 4.4 | 5.3 | 6.5 | 8.6 | 10.9 | 8.7 | — |
| $O_2$ concentration in pillow (%) | 1.3 | 1.3 | 1.3 | 1.1 | 0.6 | 0.6 | — |
| $CO_2$ concentration in pillow (%) | 33.8 | 33.1 | 33.6 | 34.1 | 34.0 | 35.2 | — |
| Biting | Nothing | Nothing | Nothing | Nothing | Nothing | Nothing | Nothing |

In a range of from 1 L to 14 L/min by flow rate of the main nozzle, a biting didn't occur in sealing process. In a range of from 1.0 L to 7.0 L/min by flow rate of the main nozzle, the $O_2$ concentration in the package product decreased when the flow rate had been increased. In contrast, in a range of more 7.0 L/min by flow rate of the main nozzle, the $O_2$ concentration didn't change. Therefore, we adopted the main nozzle 7.0 L/min and shower nozzle 10.9 L/min as a flow rate of the replacement gas in the pillow packaging. When the machine had successively driven at the setting flow rate, the $O_2$ concentration was stable in the packaged product.

1, 5 Study of Mixture Ratio of the Replacement Gas

Storing the pillow packaged product sealed the solid milk, the packaging shrunk and the adhesion between the solid milk and the packaging increased. As the adhesion increase, the solid milk is fixed within the packaged product, so the solid milk wasn't broken when the pillow package had been dropped. Thus, the packaged product decreased after a given period because it is thought that the carbon dioxide within the packaged product was absorbed by the solid milk. In contrast, when the carbon dioxide had been too much in the packaged product, the packaged product shrunk excessively. In this case, a distinct fold occurred in the packaged product. In this case, the solid milk was difficult to take out because when the packaged product has been opened, the fold still occurred. From such standpoint, a carbon dioxide concentration was studied.

1, 5, 1 Solid Milk Using Powdered Milk 2

The solid milk was manufactured using the above powdered milk 2.

When volumes of 4 pieces of solid milk held in the packaged product and 5 pieces of solid milk held in the packaged product were 46 ml and 56 ml respectively, the carbon dioxide concentration (a mixture ratio of carbon dioxide and nitrogen gas) in the packaged product was studied.

For the packaged product holding 4 pieces of solid milk, the $CO_2$ concentration was studied in a range of from 30 volume % to 70 volume %. And for the packaged product holding 5 pieces of solid milk, the $CO_2$ was studied in a range of from 30 volume % to 100 volume %. In the present example, the mixed gas of carbon dioxide and a nitrogen gas were used as the replacement gas. The mixed gas of carbon dioxide and a noble gas or the mixed gas of a nitrogen gas and a noble gas may be used as the replacement gas. And the separate gas may be also supplied from a plurality of the nozzles.

Figure 8:
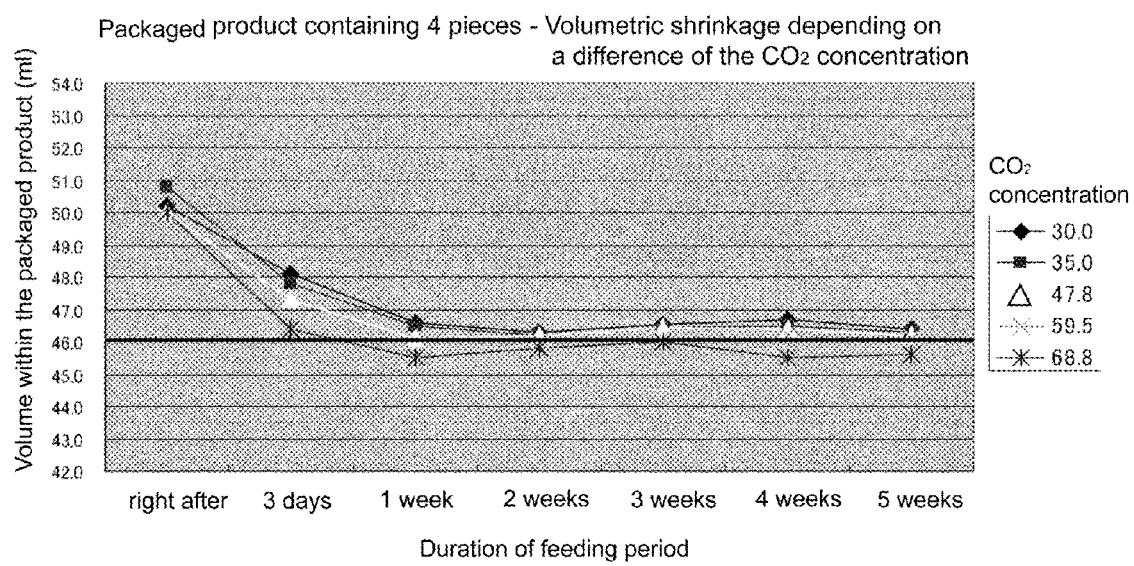
FIG. 8 is a graph instead of a figure showing the condition of the carbon dioxide concentration contained in the replacement gas and the volumetric shrinkage of the packaged product holding 4 pieces of solid milk.

FIG. 8 is a graph instead of a figure showing a condition of the carbon dioxide concentration contained in the replacement gas and the volumetric shrinkage of the packaged product holding 4 pieces of solid milk. The volume within the packaged product is a value including the content in this figure. The initial volume of the packaged product was 50 ml. As shown FIG. 8, it find that the shrink of the packaged product reach an equilibrium state by about one week after sealing. In addition, as shown FIG. 8, when the carbon dioxide concentration of the replacement gas was changed, volumetric shrinkage were same degree in a range of from 30 volume % to 70 volume % by the carbon dioxide concentration.

Figure 9:
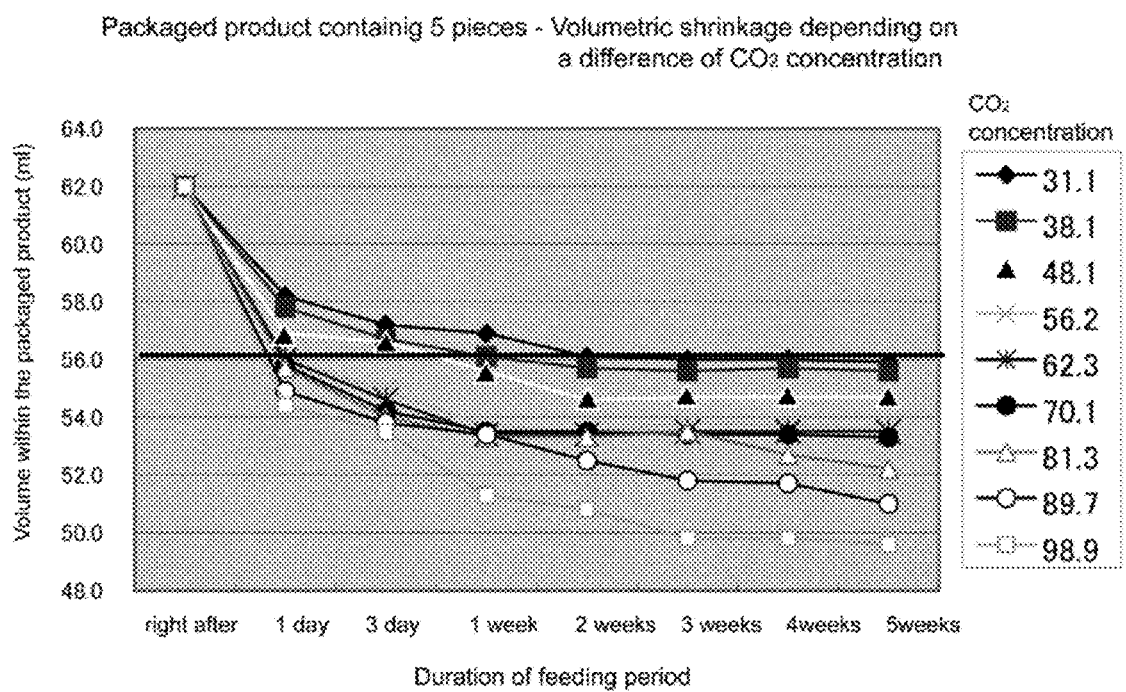
FIG. 9 is a graph instead of a figure showing the condition of the carbon dioxide concentration contained in the replacement gas and the volumetric shrinkage of the packaged product holding 5 pieces of solid milk.

FIG. 9 is a graph instead of a figure showing a condition of the carbon dioxide concentration contained in the replacement gas and the volumetric shrinkage of the packaged product holding 5 pieces of solid milk. The volume within the packaged product is a value including the content in this figure. The initial volume of the packaged product was 62 ml. As shown FIG. 9, it find that the shrink of the packaged product reach an equilibrium state by about one week after sealing. In addition, as shown FIG. 9, when the carbon dioxide concentration in the replacement gas is 38 volume % or more, the packaged product shrinks excessively. On the other hand, when the carbon dioxide concentration in the replacement gas is 31 volume % or less, the packaged product needs a long period for shrinking to a given volume (56 ml). Therefore, if the content is solid milk, it will be thought that the carbon dioxide concentration in the replacement gas is preferably from 31 volume % to 38 volume % and 35 volume % is best.

1, 5, 2 Solid Milk Using Powdered Milk 1

The solid milk was manufactured using the above powdered milk 1.

Figure 10:
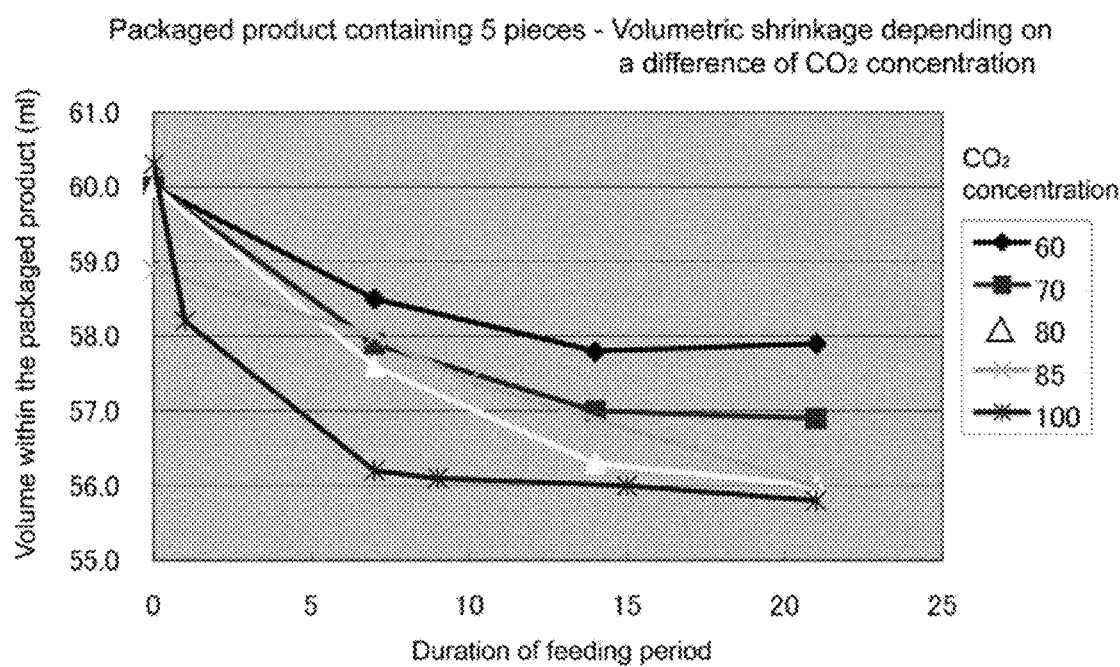
FIG. 10 is a graph instead of a figure showing the condition of the carbon dioxide concentration contained in the replacement gas and the volumetric shrinkage of the packaged product holding 5 pieces of solid milk.

FIG. 10 is a graph instead of a figure showing a condition of the carbon dioxide concentration contained in the replacement gas and the volumetric shrinkage of the packaged product holding 5 pieces of the solid milk. In this example, the carbon dioxide concentration in the replacement gas was adjusted to from 60 volume % to 100 volume %, and the progress of the volumetric shrinkage within the packaged product was confirmed. The volume of the packaged product is a value including the content in this figure. As shown FIG. 10, it is thought that the replacement gas includes preferably 100% of carbon dioxide.

Figure 11:
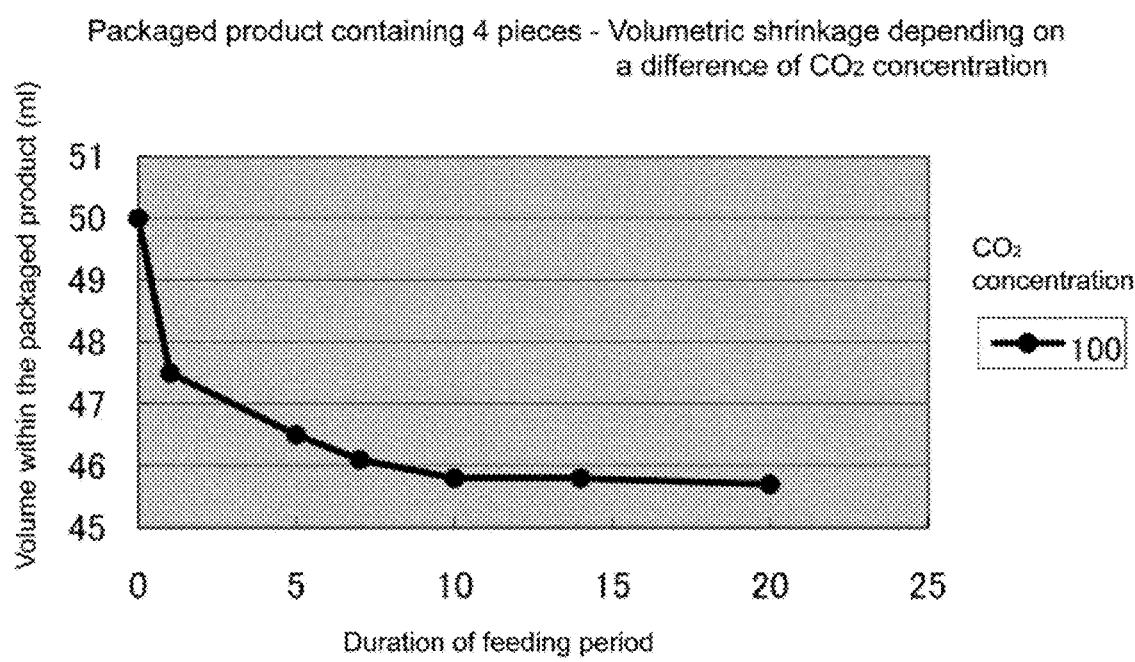
FIG. 11 is a graph instead of a figure showing the condition of the carbon dioxide concentration contained in the replacement gas and the volumetric shrinkage of the packaged product holding 4 pieces of solid milk.

FIG. 11 is a graph instead of a figure showing the condition of the carbon dioxide concentration contained in the replacement gas and the volumetric shrinkage of the packaged product holding 4 pieces of the solid milk. The volume in the packaged product is a value including the content in this a figure. If the replacement gas including 100% of carbon dioxide is used, the volume of the packaged product becomes constant by about one week after sealing. Therefore, in this case, it might be also said that the replacement gas including 100% of carbon dioxide was used suitably.

Comparing the solid milk made from powdered milk 2 and the solid milk made from powdered milk 1, the volumetric reduction in the packaged product of the former is many despite the fewer protein content. It is reason that both of surface conditions are different.

INDUSTRIAL APPLICABILITY

The present invention preferably may be used in the food or pharmaceutical industry.

The invention claimed is:

1. A packaged product, comprising a packaging having one space inside the packaging and a plurality of solid milk arranged in series in the one space, the packaging sealing and holding the plurality of solid milk,
    wherein a replacement gas is contained in a space sealed by the packaging when the packaging is sealed,
    wherein the plurality of solid milk have absorbed a part of or all of the replacement gas;
    wherein the plurality of solid milk and the packaging are in an adherence state by making the plurality of solid milk absorb a part of or all of the replacement gas;
    wherein the volume of each of the plurality of solid milk is from 1 cm$^3$ to 50 cm$^3$,
    wherein each of the plurality of solid milk has a rectangular parallelepiped shape,
    wherein the density of carbon dioxide in the replacement gas is 31 to 38 volume %.

2. The packaged product according to claim 1, wherein the replacement gas contains from 20 volume % to 100 volume % of carbon dioxide.

3. The packaged product according to claim 1, wherein the solid milk sealed in the packaging are made to absorb the replacement gas in order that volume of the packaged product can be from 50 volume % to 99 volume % against volume at time of sealing.

4. The packaged product according to claim 1, wherein the packaging comprises a metal film, a first resin film formed on an upper-surface of the metal film and a second resin film formed on a lower-surface of the metal film,
    wherein the metal film is an aluminum foil film, an aluminum deposited film, an alumina deposited film, or a silica deposited film.

5. The packaged product according to claim 1, wherein the solid milk is a kind of milk prepared to a state of a solid object at room temperature.

6. The packaged product according to claim 1, wherein the solid milk is formed by a compacting process for compacting powdered milk and obtaining a solid object compacted body of the powdered milk, a humidification process for humidifying the compacted body of powdered milk obtained in the compacting process, and a drying process for drying the compacted body of powdered milk obtained in the humidification process.

7. The packaged product according to claim 1, wherein the number of the plurality of solid milk are 4 or 5.

8. The packaged product according to claim 1, wherein corner portions of the rectangular parallelepiped shape are rounded.

* * * * *